United States Patent [19]
Brinker et al.

[11] Patent Number: 4,782,449
[45] Date of Patent: Nov. 1, 1988

[54] POSITION CONTROLLER FOR GLASS SHEET PROCESSING SYSTEM

[75] Inventors: Gary D. Brinker, Perrysburg; Eric D. Fintel, Genoa; Jeffrey N. Klopping, Toledo, all of Ohio

[73] Assignee: Glasstech, Inc., Perrysburg, Ohio

[21] Appl. No.: 853,121

[22] Filed: Apr. 17, 1986

[51] Int. Cl.$^4$ .................. G06F 15/46; C03B 23/03
[52] U.S. Cl. .................... 364/473; 65/104; 65/163; 65/273; 364/132
[58] Field of Search ............. 364/473, 476, 132, 131, 364/133–136; 65/104, 106, 107, 111, 118, 160, 162, 163, 268, 273, 290, 291, 245, DIG. 13, 102

[56] References Cited

U.S. PATENT DOCUMENTS

| | | | |
|---|---|---|---|
| 3,626,165 | 12/1971 | McCall | 364/473 |
| 4,071,344 | 1/1978 | Blausey, Jr. | 65/DIG. 13 X |
| 4,319,320 | 3/1982 | Sato et al. | 364/473 |
| 4,364,766 | 12/1982 | Nitschke | 65/DIG. 13 X |
| 4,402,721 | 9/1983 | Ericson et al. | 364/473 |
| 4,431,436 | 2/1984 | Lulejian | 364/473 |
| 4,432,064 | 2/1984 | Barker et al. | 364/132 |
| 4,459,146 | 7/1984 | Farkas et al. | 364/473 |
| 4,459,655 | 7/1984 | Willemin | 364/171 |
| 4,475,937 | 10/1984 | Nitschke | 364/473 X |
| 4,575,390 | 3/1986 | McMaster | 65/104 X |
| 4,598,379 | 7/1986 | Awane et al. | 364/132 |
| 4,601,743 | 7/1986 | Canfield | 65/162 |
| 4,666,492 | 5/1987 | Thimons et al. | 65/104 X |

Primary Examiner—Joseph Ruggiero
Attorney, Agent, or Firm—Brooks & Kushman

[57] ABSTRACT

A position controller for a glass sheet processing system having a central control system including an operator interface and a master computer, the position controller including a slave computer, a port for two-way communication of multi-character command and data signals between the master computer and the slave computer, a digital to analog converter, a variable speed drive for driving a movable component in the glass processing system, a port for communicating a signal from the slave computer through the digital to analog converter for driving the variable speed drive, and absolute position encoder associated with the movable component in the system, and a port for communicating the digital signal representative of the position of the movable component to the slave computer. The slave computer system includes logic for receiving data and command input from the master computer in the central control system, processing this information as required, generating a signal capable of operating a vehicle speed drive, and reporting an echo back signal to the master computer indicating that the driven component has reached the desired position.

The slave computer also includes logic for transmitting current position and stored end point and velocity profile information back to the master computer for output to the monitor at the operator's request.

18 Claims, 12 Drawing Sheets

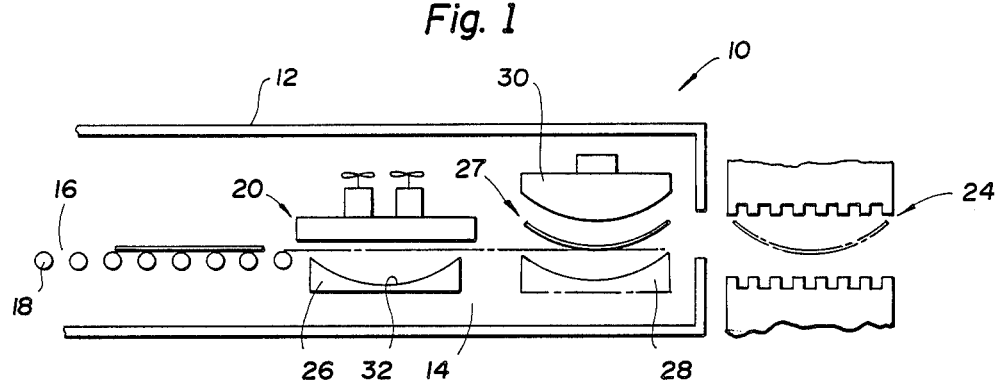
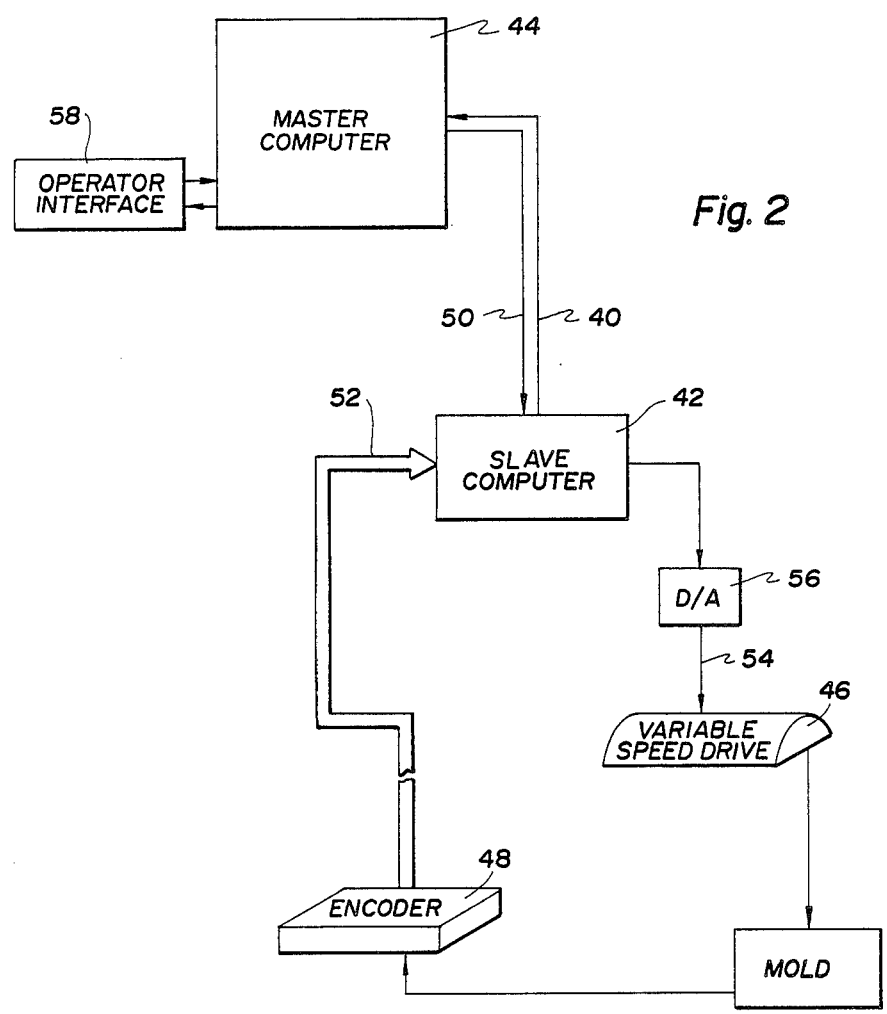

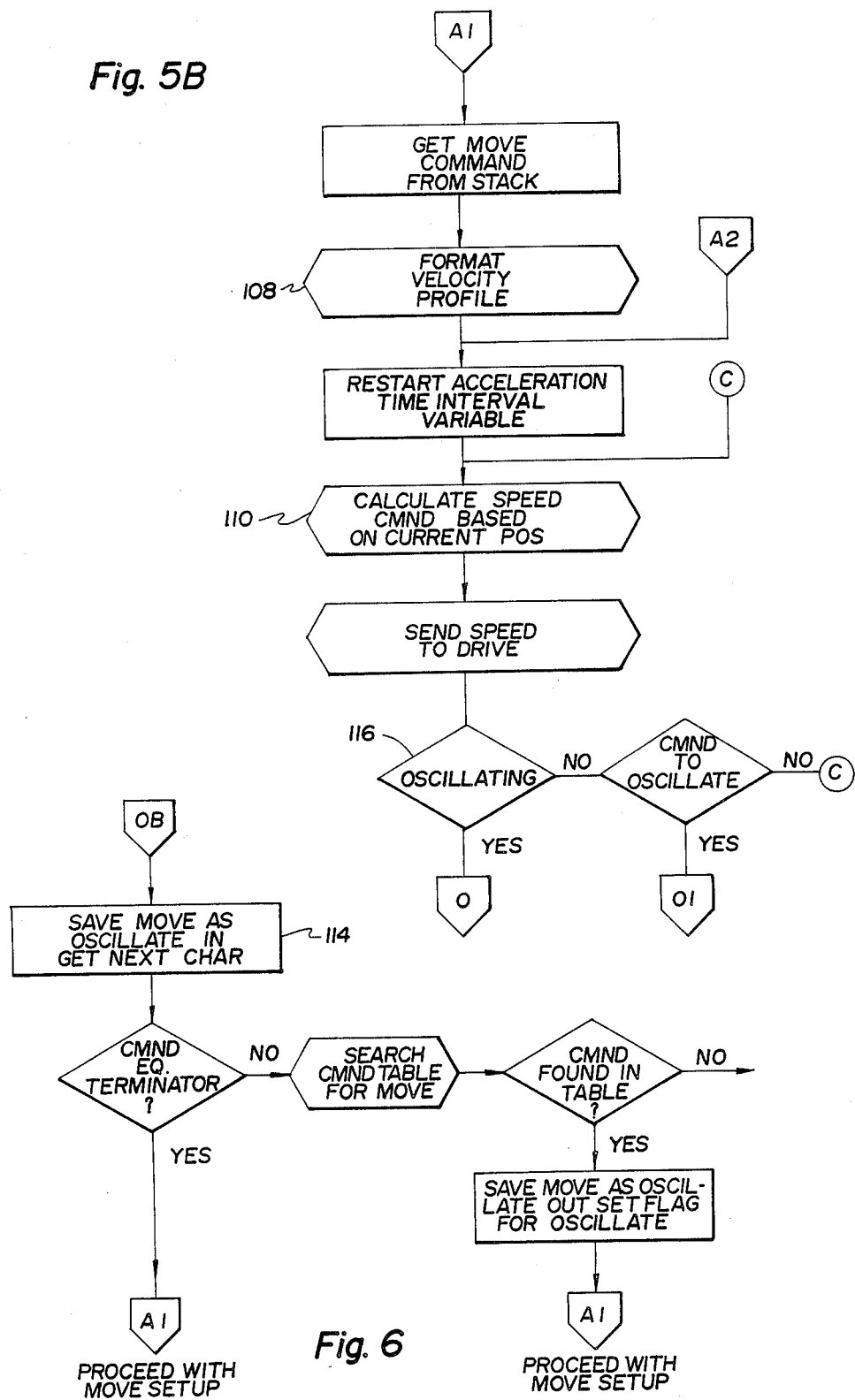

POSITION CONTROLLER FOR GLASS SHEET PROCESSING SYSTEM

TECHNICAL FIELD

This invention relates generally to controls for large glass processing systems, and more particularly to a modular position controller and communication interface system used in connection with the central control of a glass processing system.

BACKGROUND ART

Glass sheet processing systems such as the type disclosed by U.S. Pat. No. 4,575,390 include bending apparatus having one or more molds adapted to be positioned within a heating chamber and receive a heated glass sheet from a roller conveyor in preparation for tempering and/or bending.

Briefly, the glass processing system typically includes a furnace defining a heating chamber through which glass sheets are conveyed for heating in preparation for bending. The bending apparatus of the preferred system includes a roller conveyor for supplying heated glass to one or more curved molds. The curved molds typically take the shape of a surface having a complex curvature that is generally convex in nature or a complimentary concave surface in the form of an open center ring. The heated glass is formed by placing the sheet in a series of steps on a mold and moving the mold(s) relative to the glass to provide an accurately formed curvature according to a preselected design. The molds are each typically mounted for movement along a single axis. Thus, a position controller of the present invention would be required for each of these movable members.

The quick and accurate positioning of the molds during various stages of the process is an important factor in achieving a high quality product in this bending and tempering process. Thus, the processing system must include a central control system capable of simultaneously monitoring various conditions throughout the system and simultaneously positioning various movable components of the system according to the process.

The central control system typically includes an operator interface or console which may be in the form of a teletype unit for inputting various data, such as selected important mold positions and desired temperatures, into a master computer. The master computer monitors various conditions, such as the actual temperature at various selected points in the furnace, and transmits this information to the operator through the console or other suitable data output device.

The master computer also communicates with one or more position controllers. The position controller processes positioning commands received from the master computer, receives input from a position sensor located on the driven component, and issues a signal to activate the variable speed drive unit for that component causing the driven component to move according to the appropriate velocity profile to the desired point.

One disadvantage of existing glass processing position control systems is that communication between the master computer and the slave computer is limited to two-wire open-loop transmission of single ASCII character commands. This limited communication, while sufficient to allow for transmission by the master computer of single character motion commands, and transmission by the slave computer of single character acknowledgement commands, greatly restricts the flexibility of the system.

For example, the master computer cannot receive actual position information for any components from the slave computer. Thus, if the operator has manually moved (jogged) any of the components to a different position, the slave controller can ascertain this new position via its communication with a position encoder, but the master computer is not updated accordingly. Similarly, if it is desirable that a component move to a selected end point and then oscillate between two points from this position for a selected period of time, the master computer does not track the location of the mold at all times during this oscillation routine.

Also, as a result of the limited communication capabilities between the master and slave controller, the positions and desired velocity profiles for the end points cannot be downloaded by the master computer. The locations of preselected points ("end points"), along with the drive parameters and move characteristics for those points are permanently "burned" into an Electrically Programmable Read-Only Memory (EPROM) and cannot be downloaded or otherwise changed from the master computer.

Another disadvantage of existing systems is that, in situations where a movable component is periodically shuttled into and out of a furnace during the glass processing cycle, the shuttle upon which the component is mounted often undergoes thermal expansion or contraction. Thus, the actual location of the component changes during processing. This uncontrollable thermal expansion/contraction causes positioning problems, particularly when the component is programmed to move to a selected end point wherein accurate positioning is important, such as where one mold is to be mated with another mold. The operator is thus forced to make any compensation for this thermal expansion or contraction on the basis of his observation of the change in position of the mold.

Another disadvantage of present control systems is that the master computer board is different in configuration from the slave controller board so that separate replacement boards for each of the controllers needs to be kept in stock. Also, though the slave controller boards for each of the different movable molds is identical, separate replacement ROM chips, each corresponding to a particular mold or other movable component, must be kept in stock.

SUMMARY OF THE INVENTION

One object of the present invention is to provide a position controller for controlling and monitoring positionable components, such as molds, in a glass sheet processing system.

Another object of the present invention is to provide a position controller including a slave computer capable of receiving and storing data corresponding to preselected end points and velocity profile data for each of those end points on the glass processing system, wherein said data can be downloaded from the master computer in the central control system at setup time or at any time during operation of the system.

A further object of the present invention is to provide a position controller including a slave computer having an automatic thermal expansion compensator which, in response to changes in the length of the shuttle due to thermal expansion or contraction, automatically alters the value of the end point position for selected points to ensure that a movable component is correctly positioned despite the change in length of the shuttle upon which the component is mounted.

It is yet another object of the present invention to provide a position controller including a slave computer having communication means for transmitting data, such as current position information, or the value and/or the velocity profile for a selected end point, at any time in response to the operator's request transmitted from the master computer.

Another object of the present invention is to provide a position controller including a slave computer having means for receiving position commands or data from an input source such as an operator terminal or a suitably programmed master computer, sorting the commands and data according to a predefined hierarchy, and processing those commands and/or data in the order corresponding to the predefined hierarchy rather than in the order that the commands and/or data are received.

A further object of the present invention is to provide a position controller including a slave computer having means for determining when a movable component has made an unprogrammed stop during a programmed motion, and means for altering the velocity profile for that component in response to the unexpected stoppage.

Another object of the present invention is to provide a position controller including a slave computer having the capability to detect an abrupt commanded change in direction or rapid deceleration of the molds and provide controlled, time-based acceleration of the molds in order to achieve a smooth change in speed and/or direction.

The position controller of the present invention is adapted for use with a master computer having supervisory control and monitoring of the various conditions in the glass sheet processing system, and includes a slave computer, in the form of a programmable microprocessor, first input means capable of receiving position commands and position data from the master computer, logic means for processing this information as required, and first output means for generating an analog signal capable of operating a variable speed drive. The slave computer also includes second input means for receiving digital signals from a position encoder located at a fixed point on the furnace for monitoring the current position of a mold or other movable component, and second output means for transmitting current position information back to the master computer where it is output to the monitor at the operator's request.

The slave computer is programmed to receive positioning commands, retrieve end point values and velocity profiles associated with the positioning command received from the master computer and generate a series of signals which activate a variable speed drive, thereby causing motion of the controlled axis to the desired point with the desired start-up acceleration, traverse velocity, and deceleration for the requested motion. The parameters utilized to develop the requisite information for positioning to any of the selected points, including the associated velocity profiles for those points, may be downloaded to the slave computer from the master computer at setup.

Communications protocol, allowing for two-way transmission of character strings up to 80 characters long between the master computer and slave computer, allows end point position and velocity profile data to be changed and downloaded at any time.

Data is received by the slave computer from the position encoder on the moving components of the system via multibit parallel data lines. This information is utilized by the slave computer system to monitor the current position of the movable components on the furnace.

The slave computer also includes a programmable interval timer which, in conjunction with current position information, is utilized to determine an unexpected "STOP" condition and, in response, generate the necessary signals to automatically alter the current velocity profile to achieve a controlled time-based restart and positioning of the movable component to the desired end point from the unexpected stop position.

The slave computer system also includes means for determining if any programmed velocity would cause a change in the speed of the drive greater than a predetermined threshold. The slave computer system than automatically adjusts the velocity signals output to the drive to ensure a smoother transition in speed and/or direction.

The slave computer system includes an Automatic Thermal Expansion Compensator (ATEC). The ATEC feature automatically modifies the position of a preselected end point in response to a detected change in the physical length of the shuttle caused by thermal expansion or contraction of the shuttle during heating or cooling as the shuttle is moved from the inside to the outside of the furnace.

A software driven "jog" function is also provided in the slave computer system which is activated through the communications link with the master computer. This function allows the operator to employ an electric jog switch from the console to move the movable component in either direction for a period of time corresponding to the operator's activation of the switch.

Similarly, the jog switch may also be employed, in conjunction with software control of the slave computer system, to position the movable component by a single incremental unit in either direction for more accurate manual positioning. Due to the increased communication capabilities of this system, thses jog and plus/minus motion functions allow the operator to manually position the movable components during setup time, ascertain the actual position readings by interrogating the slave computer, and define these positions as end points for use during the process.

The use of a slave computer to generate the specific signals necessary to operate the variable speed drive for a particular driven component, based upon general position commands received from the master computer and actual position information received from a sensor located on the machine, simplifies and generalizes the tasks of the master computer and increases modularity within the entire control system. This increased modularity allows for easier maintenance and replacement of individual components in the overall control system.

Also, the various components of the control system, including the operator console, the master computer, and the slave computer, can be located remotely from the furnace itself such as, for example, in an operator control room.

The objects, features, and advantages of the present invention are readily apparent from the following detailed description of the best mode for carrying out the invention when taken in connection with the accompanying drawings.

BRIEF DESCRIPTION OF THE DRAWINGS

FIG. 1 illustrates one type of glass processing system which might employ the position controller of the present invention;

FIG. 2 is a block diagram of the controller of the present invention;

FIG. 5B is a continuation of the flow chart of FIG. 5A;

FIG. 6 is a continuation of the flow chart of FIG. 5, detailing the automatic oscillate function;

BEST MODE FOR CARRYING OUT THE INVENTION

Figure 3:
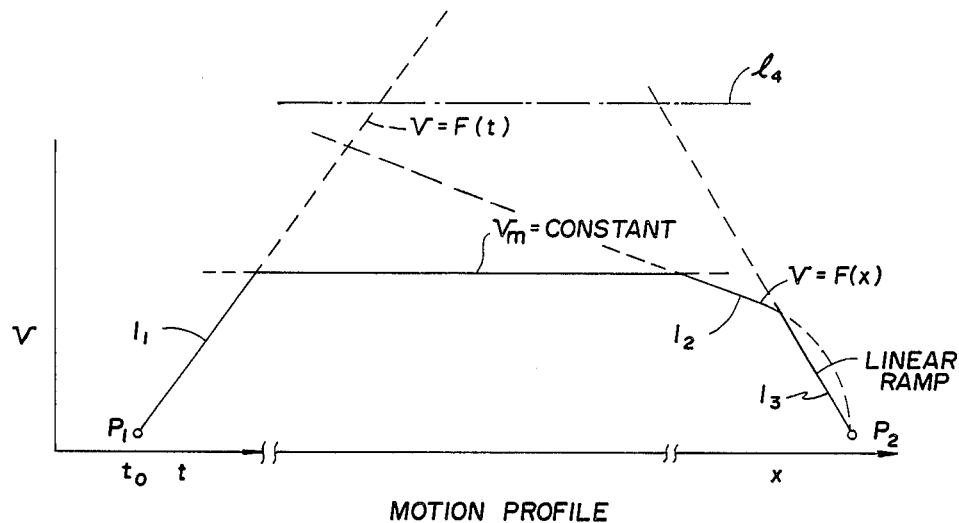
FIG. 3 illustrates a general velocity profile utilized in the present invention.

Referring to FIG. 1, a glass sheet processing system indicated generally by the reference numeral 10 includes a schematically indicated furnace 12 having a heating chamber 14 within which glass sheets are heated and bent. The system typically includes a roller conveyor 16 including a plurality of rollers 18 that support glass sheets during conveyance into and out of the heating chamber 14.

The glass processing system 10 also typically includes one or more forming stations 20, 22 and a quench station 24. The forming stations may include one or more curved molds 26-30. The curved molds 26-30 may be of a peripheral ring type having an open center or a continuous surface mold depending on the particular glass sheet being formed. The curved surface 32 of the mold 26 has a generally concave shape in an upwardly facing direction such that peripheral portions of the glass sheet initially engage the mold and the center of the glass sheet thereafter deforms downwardly under the impetus of gravity toward the shape of the mold to initially form the glass sheet.

Figure 12:
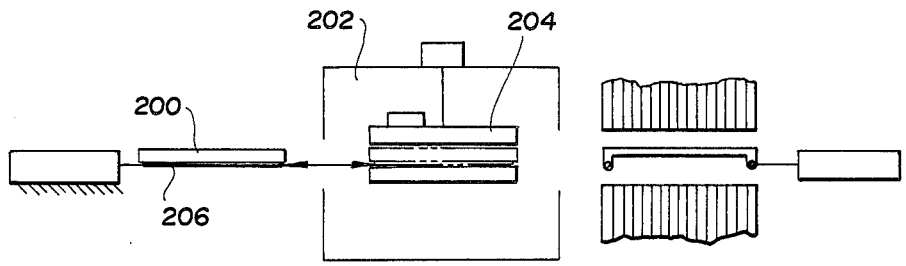
FIG. 12 is an illustration of another type of glass processing furnace which might employ the position controller of the present invention.

A curved mold 28 may be employed in conjunction with a second curved mold 30 which can be moved towards mold 28 to press the glass sheet therebetween, bending the sheet in conformance with the curved surfaces of the molds 28-30. Additional details of this glass processing system are disclosed in U.S. Pat. No. 4,575,390, which is hereby incorporated by reference. Another type of processing furnace which might incorporate the controller system of the present invention is shown in FIG. 12. Other glass processing systems employing movable molds and/or other components which are required to move to preselected points at variable speeds might also employ the controller of the present invention.

A separate, variable speed drive (not shown) drives each of the molds 26-30 about a single axis. Conventional variable speed drive mechanisms are preferably employed for this purpose.

FIG. 2 illustrates, in block form, the position controller of the present invention which may be utilized to control one or more of the movable molds 26-30 or other like components in a glass processing system. The positioning control system of the present invention, generally referred to as 40, includes a slave computer 42, a digital to analog converter 56, a variable speed drive 46, and an absolute position encoder 48.

The slave computer 42 includes a microprocessor, static random access memory (RAM), and at least three communication ports, preferably in the form of a serial RS-232-C port 50 for communicating with the master computer, a parallel port 52 for communicating with the absolute position encoder 48, and an analog line 54 connected to the variable speed drive 46. A suitably programmed MIKUL 6809-4 monocard microcomputer, manufactured by TL Industries, Inc., Norwood, Ohio, is preferably employed and includes the components shown in FIG. 2 as the slave computer 42 and the digital to analog converter 44. The MIKUL 6809-4 has a Motorola 6809 microprocessor, serial RS-232-C port, four parallel I/O ports, a real time clock, up to 4K bytes of static RAM, up to 32K bytes of EPROM as well as a D/A converter.

The absolute position encoder 48 is preferably a 16 bit resolver of the type commercially available from Computer Conversions Corporation, East Northport, N.Y.. However, a conventional optical encoder of suitable resolution may be substituted for this purpose.

The slave computer 42 of the position controller 40 is driven by a master computer 44 which is connected for two-way communication by the RS-232-C serial port 50. The master computer is also preferably a MIKUL 6809-4 monocard microcomputer and is suitably programmed to monitor various selected conditions in the glass processing system, such as current temperatures and current positions of other movable components (with the aid of information received from the slave computers controlling these components). The master computer also serves as the receptor of operator input via a suitable operator interface 58 such as a conventional data input terminal or other data input device.

Through direct operator input, or as a result of a preprogrammed action, the master computer 44 may download a series of move commands or end point positions and velocity profiles for selected end points to the slave computer. The main computer 44 may also interrogate the slave computer 42 for current position information or position and velocity profile data for selected end points via the two-way communications link 50 to the slave computer 42.

The slave computer 42 provides the master computer 44 with requested current position information ascertained from the absolute position encoder 48, memory and the variable speed drive 46, and performs the necessary calculations to determine and generate a signal which drives the variable speed drive 46, thereby moving the associated mold to a preselected position at a preselected velocity profile.

The position controller 40 under the guidance of the slave computer 42 programmed in a manner as described in fuller detail hereinafter, performs the tasks necessary to position the mold 30 within the glass processing system 10, monitor its movement, and report selected information back to the master computer 44.

This separate position control subsystem improves the modularity of the glass processing control system. Also, features necessary and specific to the positioning of the mold driven by the position controller 40 are accomplished in the slave computer's 42 system thereby reducing the complexity of the master computer's 44 system. Increased modularity, coupled with increased communications capability between the slave computer 42 of the position control system 40 with the master computer 44 in the glass processing system 10 also simplifies debugging, maintenance and modification operations on both the master and slave systems.

In a glass processing system 10 of the type shown in FIG. 1, it is desirable that the various movable components such as the molds 26–30 can be moved to certain preselected points at certain times during the glass tempering/bending process. It is also desirable that the mold be positioned from its present position to the next desired end point at a certain preselected velocity profile. As shown in FIG. 3, the typical profile includes a controlled, time-based acceleration from the mold's current position $P_1$ until the mold reaches the lower of either a preselected maximum velocity $V_m$ or the indicated velocity on the deceleration curve $l_2$, at which time the mold moves toward its intended end point at this maximum velocity. As it nears the end point, the mold decelerates to a stop, preferably at the desired end point $P_2$. It should be noted that, though the system generally selectes the lessor of the $l_1$, $V_m$, $l_2$, or $l_3$ velocities, this profile, and thus the velocity selected changes considerably with the operator's choice of parameters relating to these velocity curves. In particular, the operator's choice of a maximum velocity $V_m$ may be set at a value that is so high (as illustrated by $l_4$) that the system always selects a velocity from $l_1$, $l_2$, or $l_3$ on a programmed motion from $P_1$ to $P_2$.

As will be discussed in further detail below, a set of parameters defining the characteristics of a particular velocity profile for each end point is downloaded from the master computer 44 to the slave computer 42 in the positioning controller 40. From these parameters, a unique velocity profile generally of the form shown in FIG. 3 is generated for the motion to the end point associated with that velocity profile. The slave computer then generates the appropriate signal to the variable speed drive to achieve the positioning of the mold to the selected end point with the speed changes necessary to match the associated velocity profile.

The set of parameters associated with each particular end point and its velocity profile is downloaded from the master computer 44. These parameters include a status byte (which may be set to indicate whether thermal expansion compensation or some other selectable feature is desired for any motion to this particular end point), the identity of an echo back character to be used to tell the master computer 44 when the mold is in the requested position, an acceleration rate (that is, the rate of increase of velocity during the start-up portion of the motion), a deceleration rate (that is, the rate of decrease of velocity during the end portion of the motion), the maximum desired velocity for this motion, the linear ramp offset (that is, the distance from the end point at which the deceleration profile switches from the curve defined as $l_2$ to $l_3$), a delta value representing the change in distance, and a delta value representing the change in velocity which together define the slope of the linear ramp, $l_3$, and an encoder 48 value for the end point of this move.

As will be hereinafter described in greater detail, the slave computer 42 of the position controller 40 is programmed to retrieve these parameters from its RAM whenever it receives a command from the master computer 44 requesting a move to that end point, and create the requested unique profile for that move.

Figure 4:
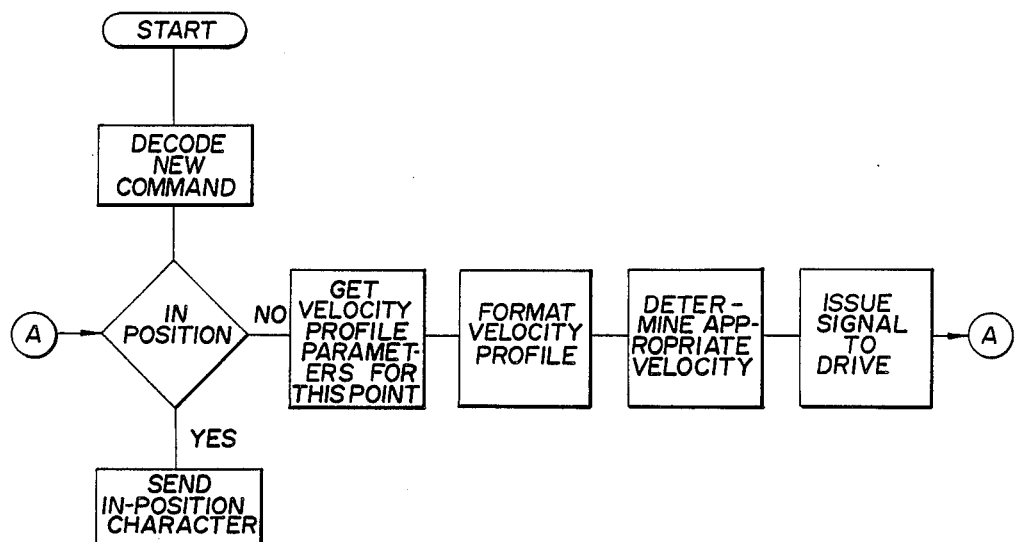
FIG. 4 is a block diagram of the basic functions performed by the slave computer.

FIG. 4 illustrates the basic functions of the slave computer 42. Upon receipt of a string of characters from the master computer 44, the slave computer first determines whether that string of characters corresponds to data, such as new position and velocity profile data for a selected end point, or a command. The computer then determines whether the command is a request for information, such as the current position of the mold or the current position and velocity profile of a particular end point, or a command to move the mold to one of the programmed end points.

The slave computer 42 preferably includes means for sorting the data or commands received from the master computer according to a preselected hierarchy. In the preferred embodiment, motion commands are placed in an input buffer for priority commands, while information requests and downloaded data are placed in a nonpriority input buffer. As priority commands are received and placed in the input buffer, processing of nonpriority commands and/or data downloading is suspended pending processing of the priority commands. One way of implementing this hierarchical processing is by use of commercially available operating systems having foreground and background processing. Thus, by establishing motion commands as top priority, motion commands, data downloading, and information inquiries may be input in any order and at any time without interfering with the operation of the glass sheet processing system.

Referring again to FIG. 4, if the slave computer 40 receives a motion command, the system next determines whether the mold is currently in the position corresponding to the desired end point. If it is necessary to move the mold, the system retrieves from memory the velocity profile parameters associated with this particular end point and utilizes these parameters to format a velocity profile for this motion. The velocity profile is formatted by adapting a generalized set of acceleration curves stored in a table in RAM in the slave computer 42, and identified by $l_1$, $l_2$, and $l_3$ in FIG. 3 to the particular acceleration parameters programmed for this end point. The system then determines the appropriate velocity by choosing the lowest of the start-up acceleration velocity ($l_1$), the maximum selected velocity ($V_m$), the deceleration velocity ($l_2$), or the linear ramp approach velocity ($l_3$). Once the correct velocity is determined, the system issues a signal sufficient to activate the variable speed drive at the required velocity. This sequence of steps is repeated until the current position information, received from the absolute position encoder 48, indicates that the mold is in position. At this point the slave computer 42 sends an "echo back" character to the master computer 44.

Figure 5A:
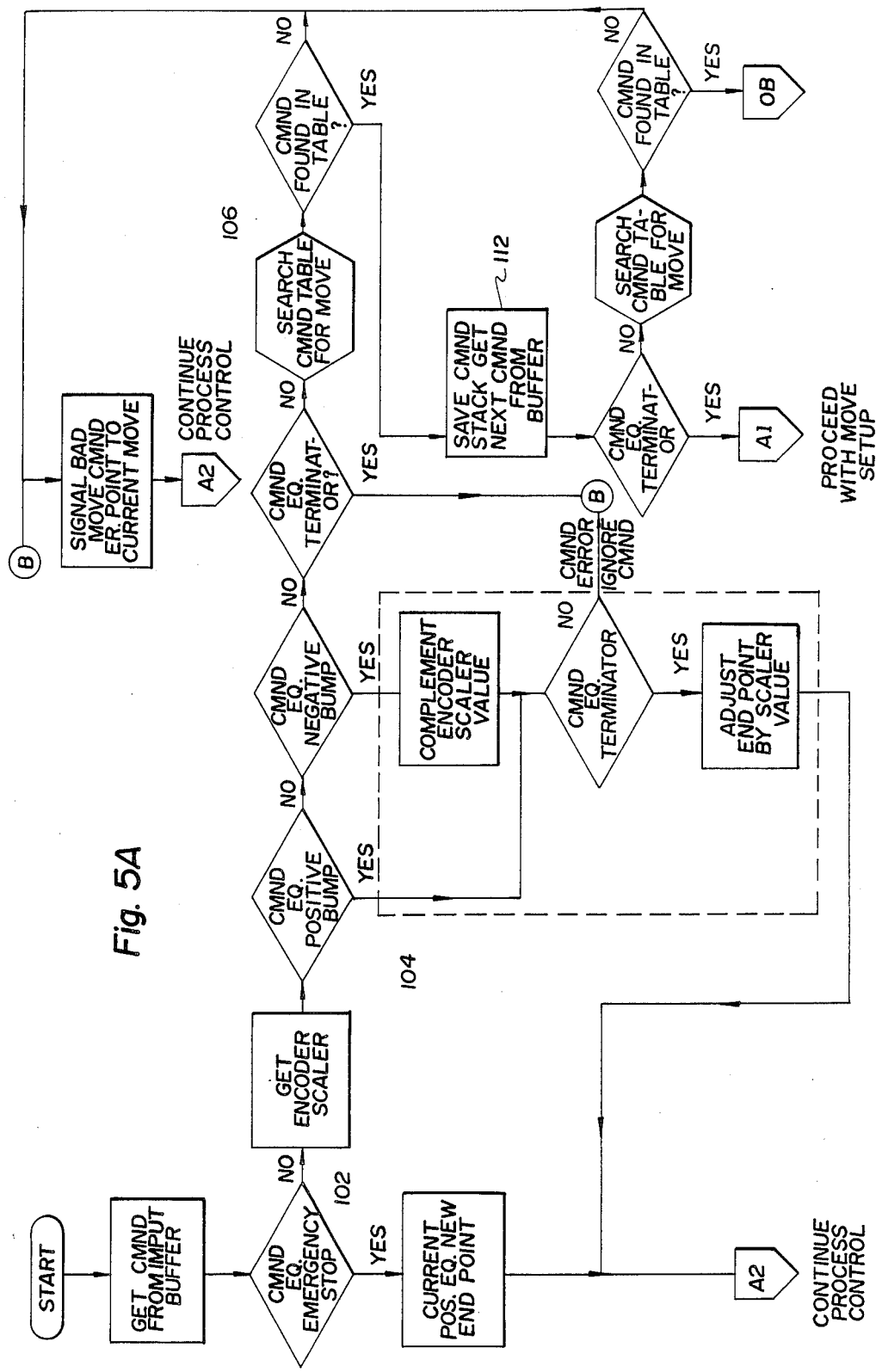
FIG. 5A is a flow chart detailing the basic functions performed by the slave computer.

FIGS. 5A and 5B illustrate the system function for processing a move command in greater detail. The slave computer 42 retrieves the next command from an input buffer in the slave computer 42 which retains a queue of commands received from the master computer 44.

If the command is an emergency stop, the system installs the current position as the new end point, then (proceeding to point A2 in the flow chart) calculates the required speed command based upon the current position and sends the appropriate signal to the D/A converter 48. This signal is preferably in the form of a 10-bit signal which is converted to a corresponding voltage signal for transmission to the variable speed drive 46.

If the command is not an emergency stop command, the system follows the steps along the path from the point identified at 102. Assuming the command is not a POSITIVE BUMP or NEGATIVE BUMP command, the system skips the tasks outlined by the dashed box identified as 104 and searches its table of programmed end points and drive profile parameters to determine if it can perform the requested move (at 106).

If the requested end point and associated velocity profile is found in the table, the system proceeds to format the velocity profile for this end point (at 108). After the unique velocity profile for that end point is formatted, the accelerating time interval variable is set to zero and the appropriate speed is calculated as previously described (at 110). The accelerating time interval variable equals the value of t used to obtain the corresponding velocity from the linear acceleration portion of the velocity profile, $1_1$.

Once the appropriate speed is calculated as more fully described hereinafter in connection with FIGS. 9 and 10, a 10-bit digital signal is sent to the D/A converter 56 (shown in FIG. 2). This 10-bit digital signal is then converted by the D/A converter 56 to a corresponding voltage which is transmitted to the variable speed drive. The speed calculation at 110 and subsequent signal generation is repeated until the current position equals the desired end point.

Referring again to FIG. 5A at 102 on the flow chart, if the command is a POSITIVE or NEGATIVE BUMP command, the system gets the encoder scaler, that is the number of units on the absolute position encoder corresponding to a single unit recognized by the operator, and, if the command is a POSITIVE BUMP, adjusts the end point by that scaler value. If the command is a NEGATIVE BUMP, it subtracts the same scaler value from the end point.

It should be noted that the software jog function employed by the slave computer is preferably implemented as a specific command which, when received by the slave computer system, generates a move to a predefined, distant end point. The velocity profile associated with this special end point is typically characterized by a gradual linear acceleration followed by motion at a relatively low constant velocity $V_m$. Because the end point corresponding to a software jog command is distant, the system generates signals directing the variable speed drive to move at the constant velocity until the operator releases the jog switch. At this time, an emergency stop causes the driven mold to be stopped and the current position to be established as the desired end point.

Formatting Velocity Profile

Figure 8:
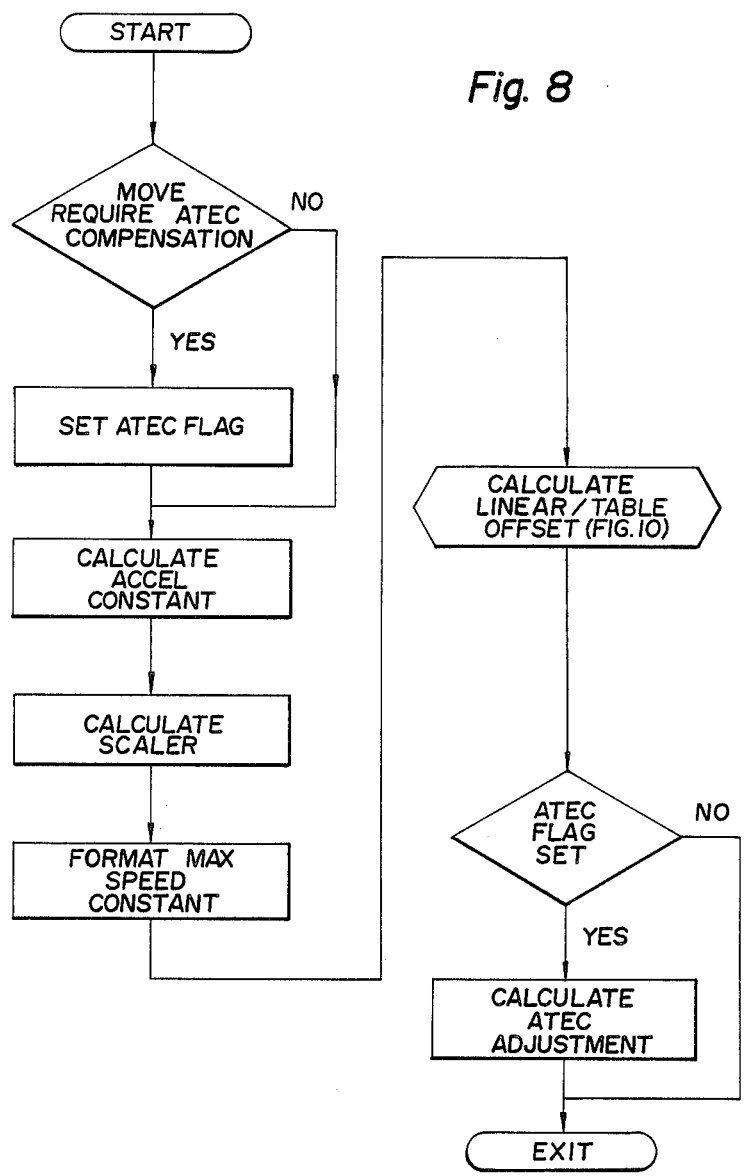
FIG. 8 is a flow chart of the operations conducted by the slave computer in formatting a command for a new move.

The function of formatting the velocity profile, shown at 108 on FIG. 5B, is shown in greater detail in FIG. 8.

For each motion to an end point, the parameters defining the particular velocity profile to that end point must be retrieved from RAM and utilized in conjunction with a normalized set of profile curves $1_1$, $1_2$, $1_3$ stored in the slave computer's 42 memory to create a velocity profile that is specific to that end point.

The general velocity profile utilized in the present invention, shown in FIG. 3, includes a first portion represented by $1_1$ wherein velocity is measured as a function of time. At each point in time from $t_0$ (the time of the start of motion from the current position to the desired end point) the velocity from which the signal is computed increases at linear rate. By relating desired velocity to elapsed time during the initial stages of the motion ($1_1$) a controlled, time-based start-up and rate of increase in velocity can be achieved. This rate of increase in velocity is, of course, determined by the programmed acceleration rate for the particular end point destination of this motion.

At the point in time the velocity ascertained from $1_1$ is equal to or greater to $V_m$, $V_m$ is then chosen as the desired velocity and the appropriate signal for that velocity is sent to the variable speed drive. This constant velocity is maintained, irrespective of elapsed time, until the mold reaches a distance X from the end point at which the deceleration velocity represented by $1_2$ for that distance X from the end point is less than or equal to $V_m$.

In order to achieve greater control over the mold as it approaches the end point, the velocity profile governing the deceleration portion of the move is a function of the distance from the point. At this point the rate of decrease in velocity follows the path illustrated by $1_2$ until the mold reaches its end point.

To provide a more stable deceleration upon the approach to the programmed end point, a linear ramp $1_3$ may be added to the velocity profile. As illustrated in FIG. 3, this ramp calls for a lower rate of change in velocity per unit distance of the variable speed drive during the approach, increasing the likelihood of a smooth and accurate finish to the motion.

FIG. 8 illustrates in greater detail the sequence of events necessary for formatting a velocity profile, the operation performed at 106 in the general sequence of events shown in FIG. 4. The system first determines whether a move to the desired end point requires automatic thermal expansion compensation. If such compensation is required, an ATEC flag is set at this point. Next, the time period acceleration constant is calculated. This constant corresponds to the desired rate of change of velocity for each time interval for the initial acceleration curve on the velocity profile (i.e., the slope of $1_1$ in FIG. 3). This acceleration constant is a function of the acceleration rate parameter downloaded from the master computer 44 and an acceleration constant relating to the specific physical characteristics of the variable speed drive for that system.

The deceleration scaler is then calculated. This scaler is associated with the point in the velocity profile curve where velocity is calculated as a function of distance (denoted by $l_2$ in FIG. 3). The profile of this curve is represented generally by the equation $$V = K\sqrt{A_d}\sqrt{X}$$

Where V is velocity, K is a drive parameter which again is a function of the specific hardware characteristics of the variable speed drive in the system, $A_d$ is the desired deceleration rate programmed for that particular velocity profile, and X is the distance between the current position and the desired end point.

Referring again to FIG. 8, the maximum speed constant, $V_m$, for this end point, is retrieved from the parameters downloaded from the master computer 44.

The linear ramp portion $l_3$ of the velocity profile is characterized by two factors. The first, the programmed offset, is the maximum distance from the end point at which the operator wishes the motion to switch from the more rapidly changing velocities characteristic of the deceleration curve of $l_2$ to the linear approach ramp of $l_3$. The second factor is the desired slope for $l_3$. This second factor is represented by the ratio of the delta parameters stored for this end point. Each of the programmed offset and slope parameters are utilized in calculating the specific linear/table offset for this end point. This offset represents the amount that the deceleration curve, represented by $l_2$, must be shifted in order to ensure that the velocity indicated in $l_2$ for a point X, corresponding to the programmed offset, is identical to the velocity retrieved from $l_3$ at that point. Additional details relating to this calculation are described hereinafter in connection with FIGS. 9 and 10.

Referring again to FIG. 8, calculation of the linear/table offset is followed by a check to see if the automatic thermal expansion compensator flag is set. If automatic thermal expansion compensation is required for this end point, the adjustment is calculated, completing the task of formatting the velocity profile for this end point.

It should be noted that the entire velocity profile can be normalized with specific parameters for each velocity profile associated with a specific end point (such as the slope of $l_1$, the value of $V_m$, the deceleration rate of $l_2$, and the slope of $l_3$) so that the normalized profile can be scaled with a minimum transfer of data from the master computer 44 and minimum storage of data in the slave computer's 40 memory.

It will be appreciated by those skilled in the art that, by storing a normalized profile in memory in the slave computer 42, and creating a specific profile for each programmed end point by scaling that normalized velocity profile with the specific parameters associated with that end point, a relatively large number of end points and associated velocity profile parameters can be stored.

In contrast, prior position controllers required that end point values and the entire table of values representing the associated velocity profiles for each end point be stored in ROM in the slave controller. In addition to using a relatively large amount of memory, the values could not be reprogrammed without removal of the ROM chip from the position controller board.

Velocity Calculation

Figure 9:
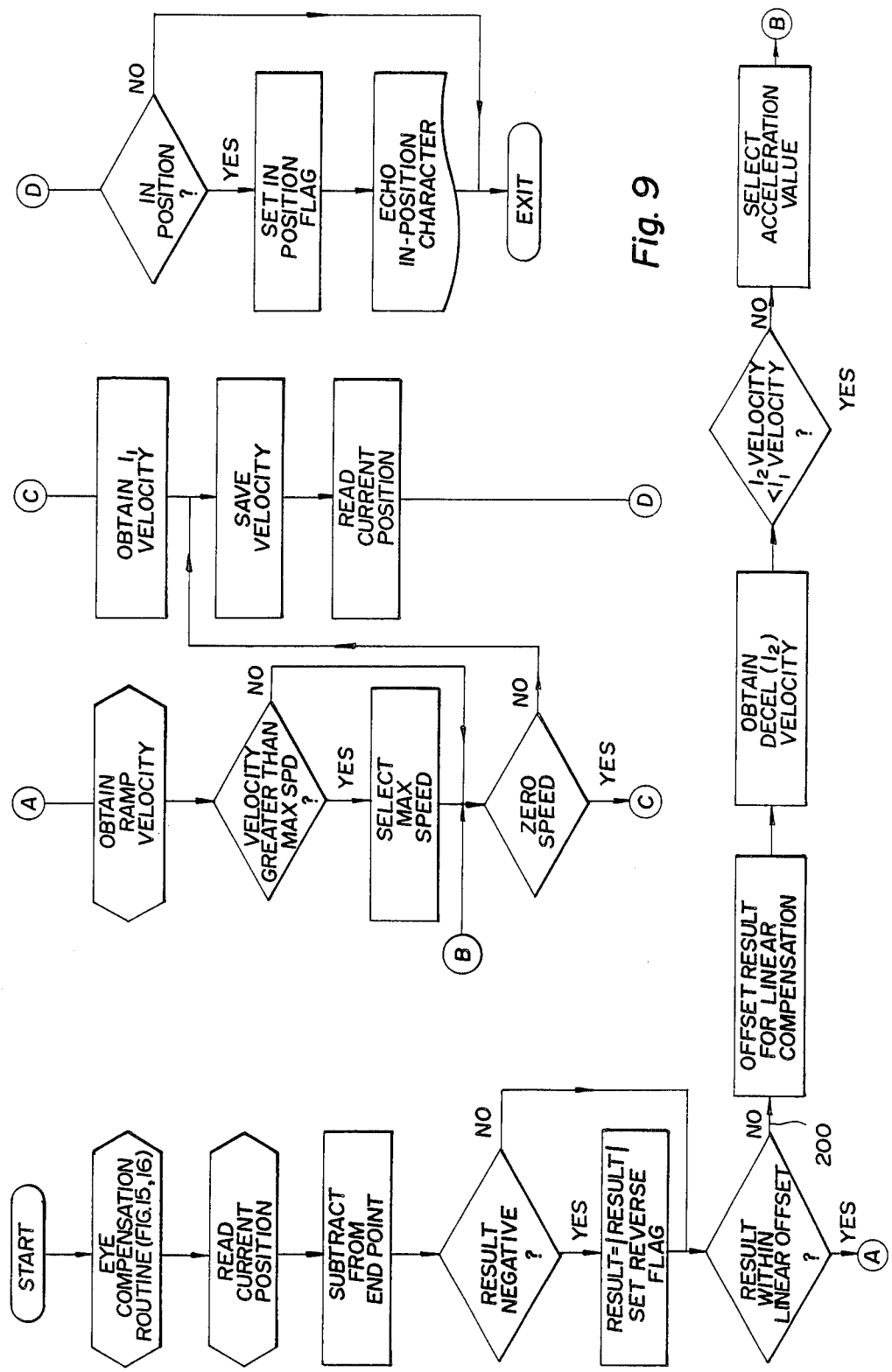
FIG. 9 is a flow chart detailing the velocity calculation and selection function.

FIG. 9 details the velocity calculation feature employed by the positioning system of the present invention and referred to at 110 of FIG. 5B. The system first determines whether automatic thermal expansion compensation has been selected for this point and performs initial tasks associated with that function as described hereinafter in connection with FIGS. 15 and 16. The system then reads the current position from the absolute position encoder and subtracts this position from the desired end point to obtain Result, equal to the distance X from the desired end point. If Result is negative, a flag is set indicating that condition. If Result is within the linear offset calculated (as described in FIG. 10) the ramp velocity, that is the velocity on the linear deceleration ramp shown as $l_3$, is obtained. If that velocity is greater than $V_m$, $V_m$ is substituted for $l_3$ velocity. If a zero speed condition is not detected, the velocity is saved and the current position is read from the absolute position encoder. If the system is not currently in the desired end point position, the operation is terminated. If the system determines that the mold is in the desired end point position, the in-position flag is set and the in-position character is echoed back to the master computer.

Referring to the point indicated as 200 in FIG. 9, if Result is not within the calculated linear offset, the linear offset is added to Result, and the velocity associated with this value is obtained from the deceleration curve, $l_2$. The lesser of this velocity and the velocity obtained from the acceleration velocity of $l_1$ is then selected and the system proceeds from point B in the flow chart as previously described.

It should be noted that if a zero speed condition is detected, the acceleration velocity, obtained from $l_1$ as a function of the current value of the accleration time interval variable, is saved in place of any previously selected velocity. This ensures that a controlled, time-based start-up will occur whenever the mold is detected to be in a stopped position.

Figure 10:
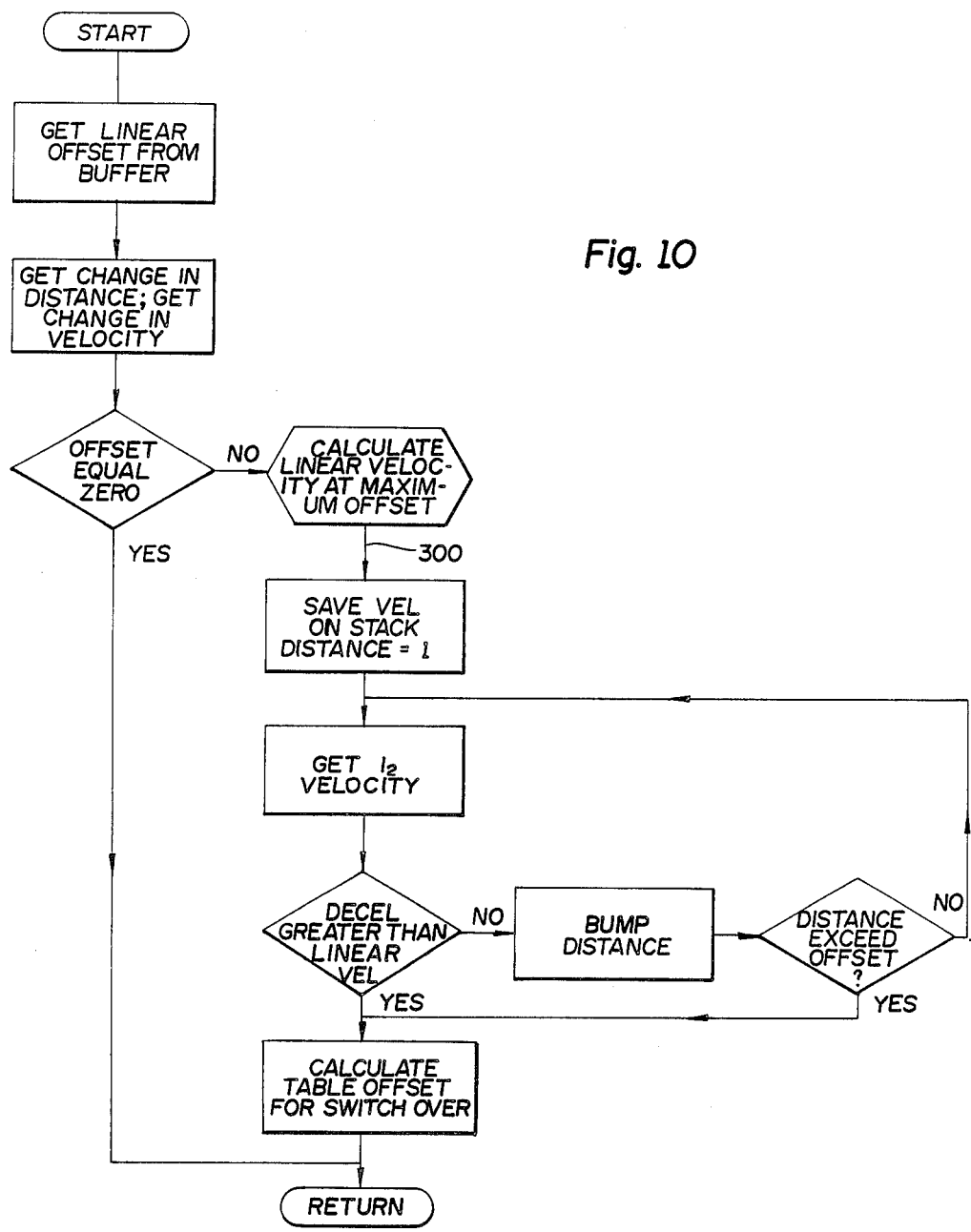
FIG. 10 is a flow chart illustrating the steps taken in calculating the switchover point for the deceleration ramp.
Figure 17:
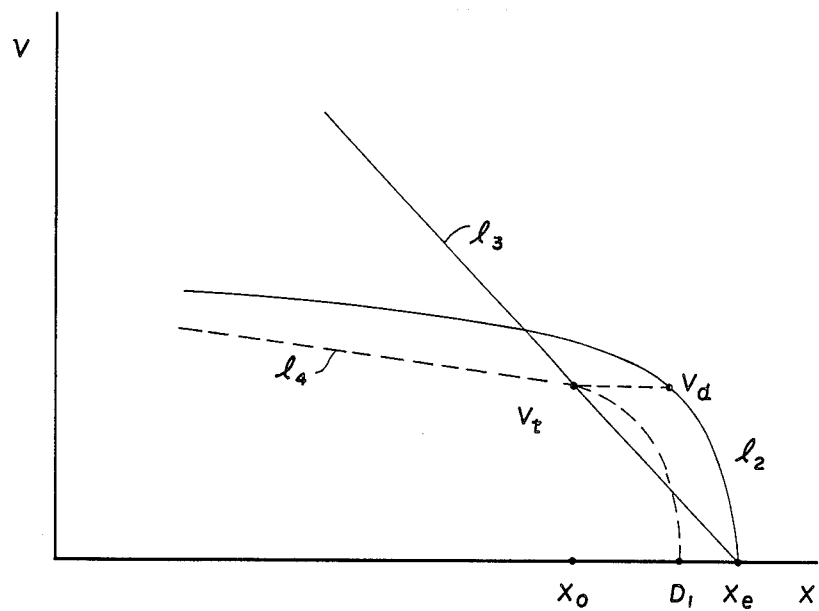
FIG. 17 illustrates the calculation of a linear offset according to the routine charted in FIG. 10.

Referring to FIGS. 10 and 17, the calculation of the linear offset for a particular end point begins with the system retrieving the current value of the linear offset from the velocity profile format buffer. The desired slope of the linear ramp, $l_3$, is also obtained. The system then checks to see if the desired offset for this end point is equal to zero. If it is, no linear deceleration ramp is desired and the system exits this routine. If a desired linear offset is programmed for this end point, the velocity on the linear ramp, $l_3$, is determined for X equal to that desired offset. As shown in FIG. 17, the velocity, $V_t$, obtained from the linear ramp, $l_3$, at a point $X_O$ equal to the desired linear offset represents the transition velocity from the deceleration curve of $l_2$ to the linear deceleration ramp of $l_3$. Referring again to FIG. 10, at 300, the transition velocity, $V_t$, is saved and a variable, Distance, is set equal to 1. Distance is a variable representing the distance from the desired end point, $X_e$. The velocity for this distance is obtained from the deceleration curve, $l_2$, and this velocity is compared to the transition velocity, $V_t$. If this velocity is less than the transition velocity, the value of Distance is incremented by one unit and a new velocity is obtained from $l_2$. This velocity is again compared to $V_t$ and the process is repeated until a velocity, $V_d$, is obtained from $l_2$ that is equal to $V_t$. At this point, the value of Distance is equal to the desired linear offset. Thus, any velocities obtained from $l_2$ will be determined as a function of the value of Result, plus the calculated linear offset, as described in FIG. 9. It will be appreciated by those skilled in the art that, by adding the linear offset to Result, the velocity obtained from $l_2$ will decrease along a curve shown as $l_4$ in FIG. 17 until, at a distance $X_0$, the transition velocity obtained from the deceleration curve is equal to the transition velocity obtained from the deceleration ramp of $l_3$. Thus, this offset ensures a smooth transition from the deceleration curve to the more gradual deceleration ramp of $l_3$.

Zero Speed Detection

Another feature of the present invention, zero speed detection, ensures that the start-up acceleration is maintained even though the mold is momentarily stopped.

As shown in FIG. 3, the system ascertains the desired velocity for each point in time according to the profile established by $l_1$ during the initial stages of motion. If the mold is stopped for a long enough period of time, the point along $l_1$ at which the velocity for that time is ascertained will yield a velocity in excess of $V_m$. While during a normal motion it is desirable to switch from this linear rate of acceleration to a constant velocity, if the mold has not moved, it is desirable that the system continue to retrieve its velocity for each point in time from $l_1$ to achieve a rapid start-up. The zero speed detection function therefore determines the current position of the mold, by reading the digital input from the absolute position encoder, and compares it with the last determined position. If that position is unchanged, or has changed by less than a programmable threshold, and time has elapsed to the extent that the velocity ascertained from $l_1$ on the profile curve is greater than $V_m$, the possibility of selection of $V_m$ is disabled and the variable speed drive is driven at the linear rate of acceleration defined in $l_1$ with the time reset to $t_0$.

Figure 11:
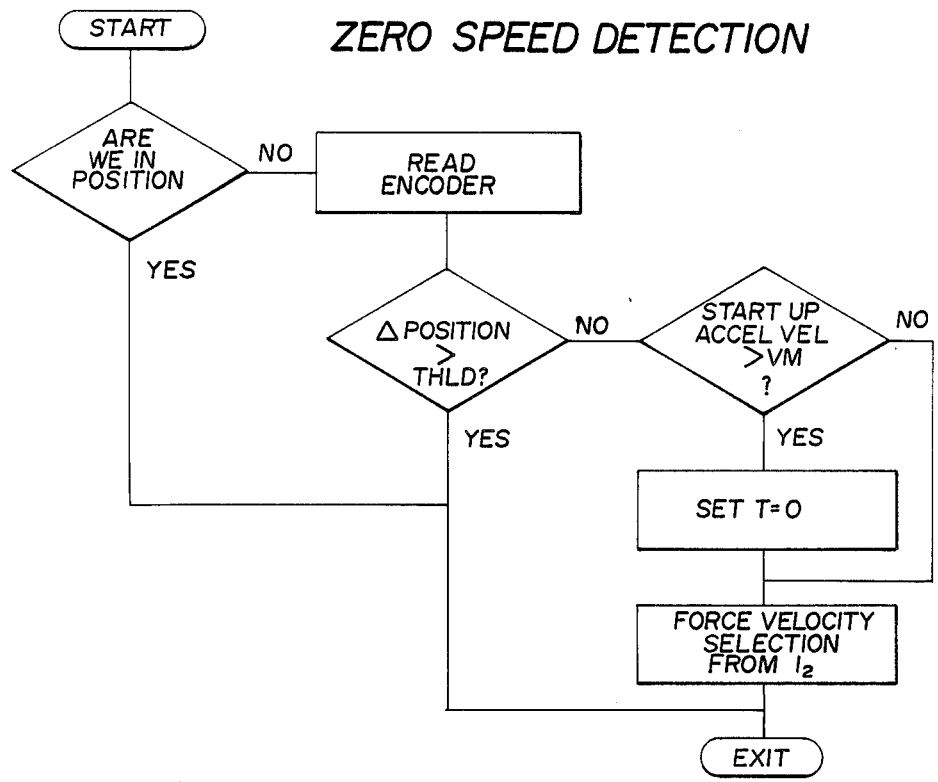
FIG. 11 is a flow chart of the zero speed detection feature.

Referring to the flow chart of FIG. 11, the zero speed detection routine begins with a determination of whether the mold is in the desired position. If it is, the system exists from this routine. If not, the current position is read from the encoder, and this position is compared to the last position. If the change in position is greater than a programmed threshold value, then the current position is saved as the last position and the system exits from the routine.

If the difference between the current position and the last position is not greater than a threshold value then the velocity is ascertained from $l_1$ of the velocity profile for that point in time. If this velocity is greater than a threshold (maximum) start-up velocity VM, the motion time, $t_1$, is set to zero to ensure that the velocity is ascertained from $l_1$ along the velocity profile curve. If the velocity ascertained from $l_1$ is not greater than the threshold start-up velocity, a flag is set to ensure that the acceleration velocity is selected and the system exits. It should be noted that forced selection of the linear acceleration rate velocity of $l_1$ ensures that the velocity signal output to the variable speed drive causes an efficient start-up from the stopped position.

Oscillate Command Function

Figure 7:
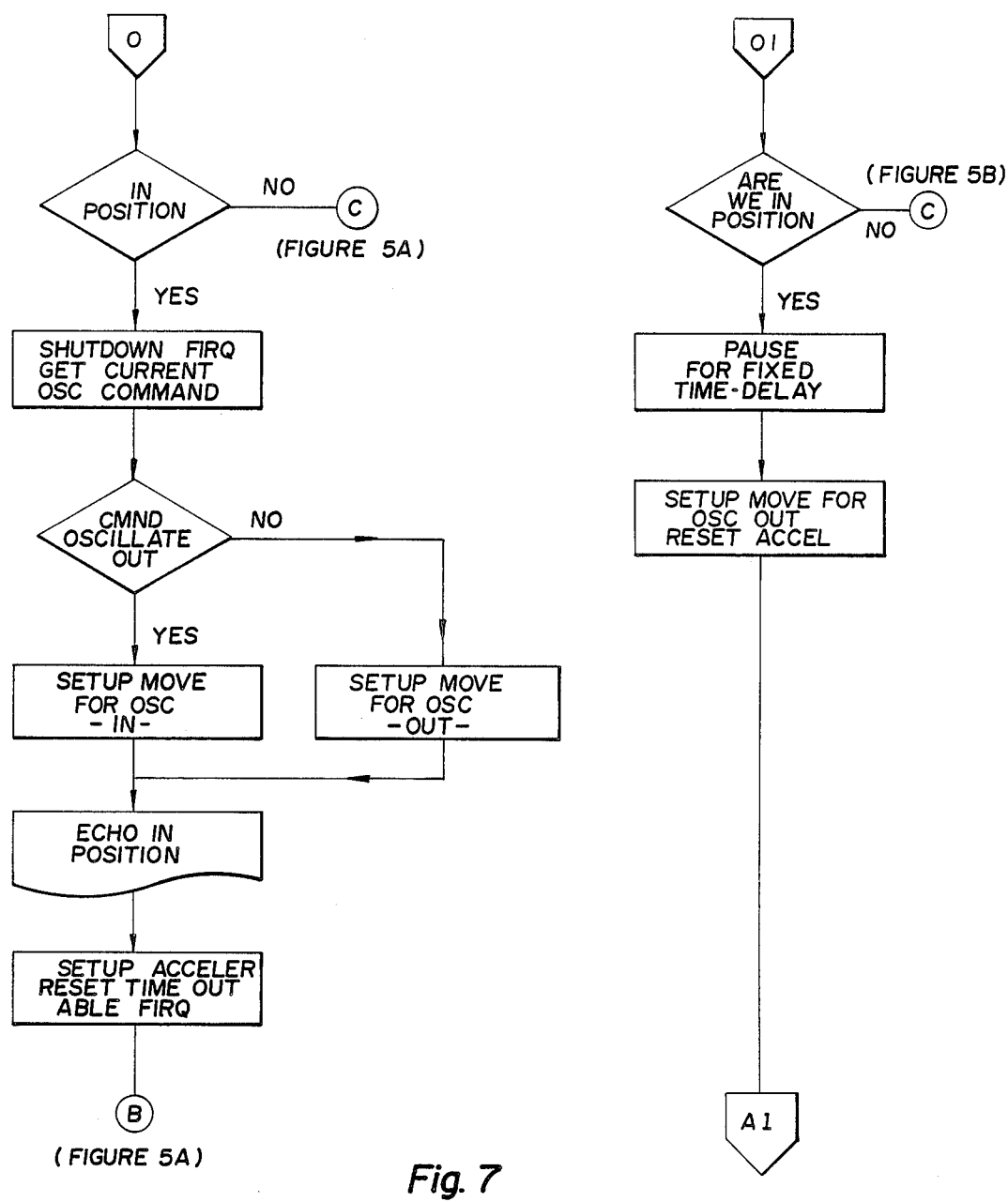
FIG. 7 is a continuation of the flow chart of FIG. 6.

FIGS. 5A, 6 and 7 detail the specific functions performed by the slave computer 42 in connection with an oscillate command. It is sometimes desirable to move the molds 26–30 to a selected end point and then oscillate back and forth between two points in proximity to that end point, such as during a quench cycle. For this purpose, a command essentially in the form of three motion commands strung together, may be sent by the master computer 44 to the slave computer 42. As shown at 106 of FIG. 5A, if a search of the command table results in retrieval of three motion commands side by side (that is, without terminator characters between the commands) the system processes the command as an oscillate command. The first programmed end point is saved as a typical motion command (112), the second programmed end point is saved as the "oscillate in point" (114), and the third programmed end point is saved as the "oscillate out point". The oscillate flag is then set and normal motion processing continues as described above and illustrated in FIG. 5B.

If, during normal processing, the system determines that the driven mold is currently oscillating or that a motion command to oscillate has been issued (shown at 116 on FIG. 5B) the oscillate routine of FIG. 7 is implemented. The system determined from the absolute position encoder whether the driven mold is in position. If it is not, the system returns to normal processing. If it is in position, the system retrieves the current oscillation command, determines whether it is an "oscillate in" or "oscillate out" command, echoes an in position character to the master computer 44 and returns, at A2, for normal processing. If a command to oscillate has just been read by the slave computer 42, the system enters the oscillate routine at OI. The system then determines whether the driven mold is currently in position. If it is not, it proceeds with normal motion processing, shown at entry point C on FIG. 5B. If the driven mold is in position, the system pauses for a time delay, referred to as a German delay, and then sets up the move to the first oscillation point, thereby initiating the oscillation routine. It should be noted that the length of the German delay can be programmed by the operator.

Automatic Thermal Expansion Compensation

Referring to FIG. 12, some glass processing systems which employ the position controller of the present invention may include a ring mold 200 which is movable on a shuttle 206 along a horizontal axis into and out of the heating chamber 202 during the process. Exposure of the shuttle 206 to varying temperatures during the process may cause thermal expansion of the shuttle 206 and, consequently, a displacement of the centerline of the mold 200 along the axis of motion of the mold 200.

Since it is often important that the mold 200 be positioned by the shuttle 206 so that the centerline is at an exact position within the heating chamber 202, for example, during mating with complimentary mold 204, this thermal expansion may cause a considerable problem.

The present system takes advantage of the capability of the slave computer to dynamically alter the location of programmed end points at any time to adjust for changes in length of the shuttle due to thermal expansion or contraction.

Figure 13:
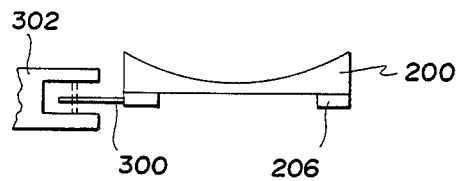
FIG. 13 is a partial view of a glass processing system including the optical scanner and flag utilized in the automatic thermal expansion compensator.
Figure 14:
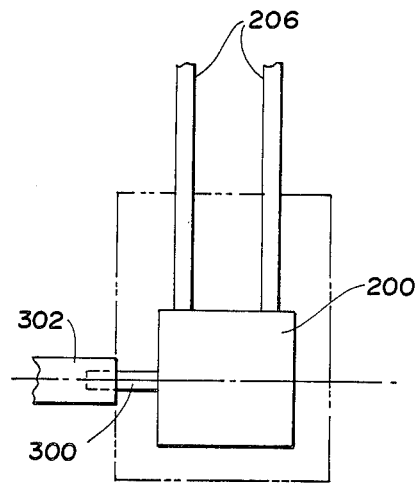
FIG. 14 is a top view of a glass processing system including the optical scanner and flag utilized in the automatic thermal expansion compensator.

Referring to FIGS. 13 and 14, an initial encoder reading is taken when a flag 300, preferably located at the centerline of the mold 200, crosses to a fixed interrogation point 302 on the machine, preferably an optical scanner, during the initial motion of the shuttle 206. At each subsequent point in time when the flag 300 passes the optical scanner 302, the encoder reading is ascertained and compared with the initial encoder position. Any change in this position, presumed to be caused by thermal expansion or contraction of the shuttle 206, may then be added or subtracted from the programmed end point so that attempted moves to that end point will result in proper alignment of the mold.

Figure 15:
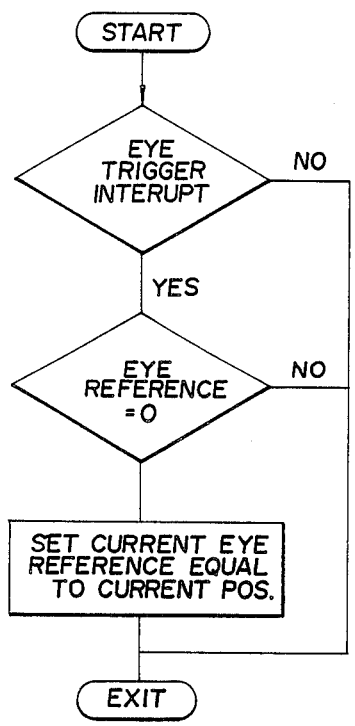
FIG. 15 is a flow chart of the automatic thermal expansion compensation feature.
Figure 16:
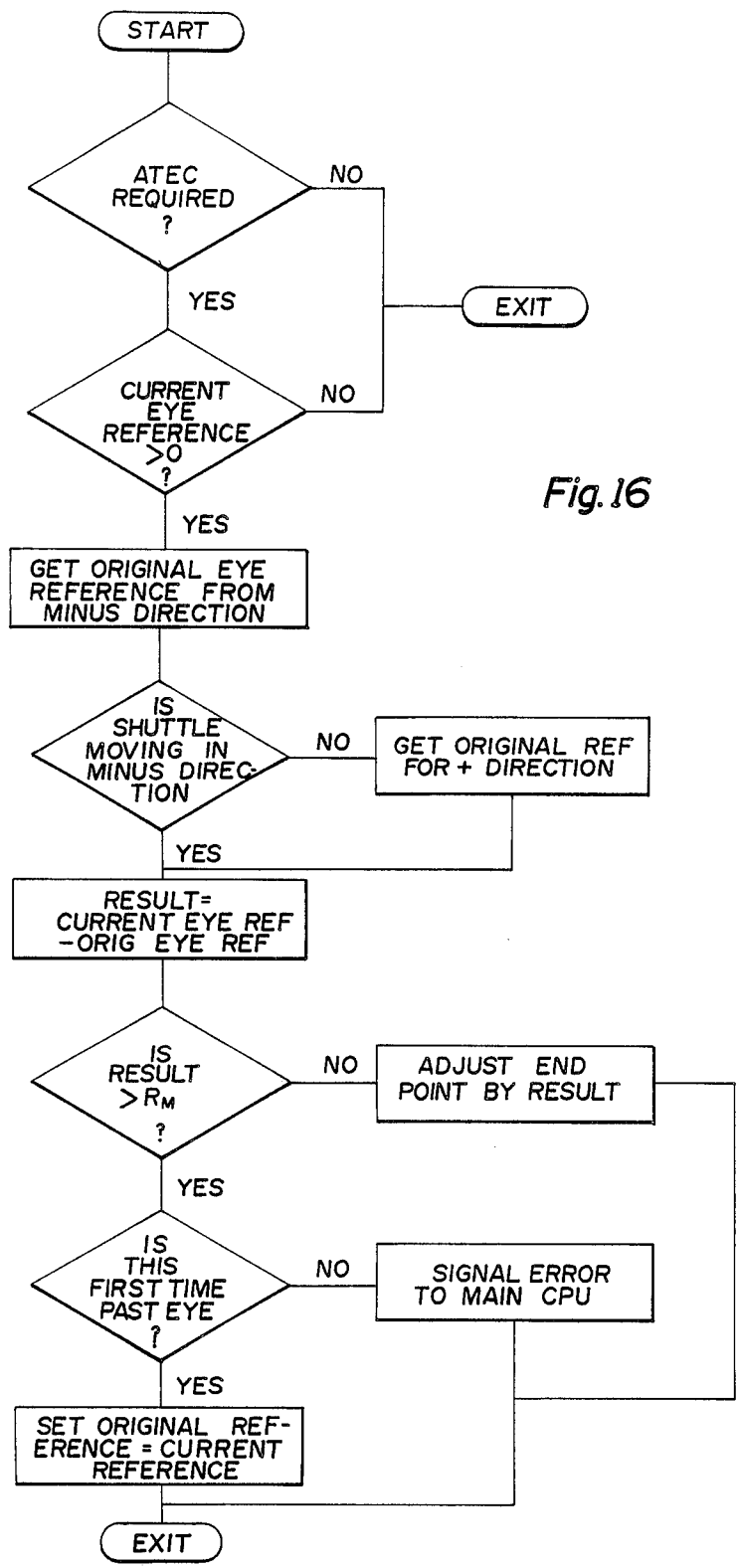
FIG. 16 is a continuation of the flow chart of FIG. 15.

A more detailed description of the automatic thermal expansion compensation is illustrated in FIGS. 15 and 16. The initial absolute position encoder 48 reading is taken when it is determined that the optical scanner 302 beam has been interrupted and the absolute position encoder 48 reading for the eye reference is equal to zero. At this point, the Original Eye Reference is set equal to the current position read from the absolute position encoder 48 (FIG. 2).

Referring to FIG. 15, during processing of a move, the system determines whether ATEC is required for that end point. If ATEC is required the system then checks to determine whether the eye reference is greater than zero. If it is, the system retrieves the Orginal Eye Reference and computes a result, equal to the current eye reference minus the Original Eye Reference. The system then determines whether the magnitude of this result is greater than a programmable maximum reference threshold $R_m$. If it is not greater than this threshold, it is assumed that this result is a difference in length due to thermal expansion or contraction of the shuttle 206, and the position of the end point in the control buffer is adjusted by the value of the result. It the result is greater than the maximum threshold and this is the first time that the optical scanner has been interrupted, the original reference is set equal to the current eye reference. If the result is greater than the threshold reference value $R_m$ and this is not the first time the optical scanner has been interrupted, an error message is sent to the master computer at 44.

This invention has been described in an illustrative manner and it is to be understood that the terminology which has been used is intended to be in the nature of words of description rather than limitation.

Many modifications and variations of the present invention are possible in light of the above teachings. It is, therefore, to be understood that within the scope of the appended claims, the invention may be practiced otherwise than as specifically described.

What is claimed is:

1. In a glass sheet processing system, a position controller for positioning a movable component driven by a variable speed drive, the position controller being adapted for use with a central control system which monitors and controls the processing of the glass sheets, the central control system including a master computer having means for providing command signals and data signals relating to preselected end points, the position controller including a position encoder connected to the movable component, and a slave computer, the slave computer comprising:
   a first input connected to the master computer for receiving digital signals corresponding to positioning commands, position data and velocity profile data from the master computer;
   a second input connected to the position encoder for receiving digital signals corresponding to current position information from the position encoder;
   a first output connected to the variable speed drive for providing control signals to the variable speed drive;
   a second output connected to the master computer for transmitting digital signals corresponding to command acknowledgement, error, position data, and velocity profile data to the master computer; and
   logic means for calculating the distance required to position the movable component from the component's current position to a preselected point, calculating the desired current velocity according to position and velocity profile data for that preselected point, and calculating a digital control signal necessary to drive the variable speed drive to move the movable component to the preselected point at the desired current velocity in response to a positioning command received from the master computer, and transmitting an acknowledge signal to the master computer when the movable component has reached the preselected point.

2. The position controller of claim 1 wherein the movable component includes a mold mounted on a shuttle.

3. The position controller of claim 1 wherein the variable speed drive is activated by an analog signal and the position controller further includes a digital to analog converter interconnected between the slave computer and the variable speed drive for receiving the digital control signal from the slave computer and converting it to a corresponding analog signal for driving the variable speed drive.

4. The position controller of claim 1 wherein the slave computer includes random access memory for storing the position data and velocity profile data downloaded from the master computer via the first input before or during operation of the controller.

5. The position controller of claim 4 wherein the velocity profile data includes a set of parameters associated with each preselected end point.

6. The position controller of claim 5 further including:
   data stored in the memory of the slave computer corresponding to a normalized velocity profile;
   logic means for combining the set of parameters associated with a particular end point with the normalized velocity profile to determine a particular velocity profile for that preselected end point; and
   logic means for periodically selecting the appropriate velocity from the particular velocity profile for output to the variable speed drive during a motion from the movable component's current position to the preselected end point.

7. The position controller of claim 6 wherein the particular velocity profile generated for a preselected end point includes a first portion, $1_1$, wherein velocity is increasing at a generally linear rate as a function of time, a second portion, $v_m$, wherein velocity is constant and a third portion, $1_2$, wherein velocity decreases exponentially as a function of the current distance of the movable component from the preselected end point.

8. The position controller of claim 7 wherein the third portion $1_2$, of the particular profile generated for a preselected end point is represented by the equation $$V = K\sqrt{A_d}\sqrt{X}.$$

9. The position controller of claim 7 wherein the particular velocity profile generated for a preselected endpoint further includes a fourth portion, $1_3$, wherein velocity decreases at a generally linear rate at a function of the current distance of the movable component from the preselected endpoint.

10. The position controller of claim 9 further including logic means for calculating a transition velocity, equal to the velocity indicated on the fourth portion 1, $1_3$, of the particular velocity profile for a preselected end point at a preselected linear offset, and logic means for shifting the third portion, $1_2$, of the particular velocity profile so that the velocity obtained from the fourth portion $1_3$, is equal to the velocity obtained from the third portion, $1_2$ when the current distance of the movable component from the preselected endpoint is equal to the linear offset.

11. The position controller of claim 10 wherein the parameters associated with each preselected endpoint include:
  data corresponding to the slope of the first portion $l_1$, data corresponding to the constant velocity $v_m$, data corresponding to the slope of the fourth portion, $l_3$, data corresponding to the linear offset, and data corresponding to the encoder value for the preselected endpoint.

12. The position controller of claim 7 further including logic means for determining when the current position of the movable component remains unchanged for a preselected threshold time period, and, if the current position is unchanged, selecting a velocity from the first portion, $l_1$, of the velocity profile with the elapsed time of the motion reset to zero thereby ensuring a smooth start-up of the movable component.

13. The position controller of claim 1 wherein the slave computer includes logic means for sorting the commands and data received from the master computer according to a predefined hierarchy, and processing those commands and data in a preselected order corresponding to the predefined hierarchy.

14. The position controller of claim 13 wherein the predefined hierarchy indicates that position commands have priority, with data corresponding to preselected end points, velocity profile data, or data inquiries being processed only after all position commands have been processed.

15. The position controller of claim 1 further including:
  a flag fixed to the movable component;
  an interrogator located at a fixed interrogation point in the system and adapted to sense the presence of the flag whenever the flag passes the interrogation point; and
  wherein the slave computer further includes
    an input connected to the interrogator for receiving a signal indicating whether the flag is currently located at the interrogation point,
    memory for storing an original reference position, and
    logic means for comparing the value of the current position of the movable component to the original reference position whenever the interrogator indicates that the flag is located at the interrogation point and adjusting the value of the preselected endpoint by the difference between the compared positions, thereby insuring that the movable component reaches the preselected endpoint despite any change in the length of the movable component.

16. The position controller of claim 15 wherein the interrogator is an optical scanner.

17. The position controller of claim 1 wherein the slave computer further includes logic means for determining when an oscillate command has been transmitted from the master computer, and thereafter calculating the distance required to position the movable component from its current position to a first preselected point calculating the desired current velocity according to position and velocity profile data for that preselected point, and calculating a digital control signal necessary to drive the variable speed drive to move the movable component to the first preselected point at the desired current velocity, calculating the distance required to position the movable component from the first preselected point to a second preselected point, calculating the desired current velocity according to position and velocity profile data for that preselected point, and calculating a digital control signal necessary to drive the variable speed drive to move the movable component to the second preselected point at the desired current velocity, calculating the distance required to position the movable component from the second preselected point to a third preselected point, calculating the desired current velocity according to position and velocity profile data for that preselected point, and calculating a digital control signal necessary to drive the variable speed drive to move the movable component to the third preselected point at the desired velocity profile, and transmitting an acknowledge signal to the master computer when the movable component has completed the oscillation.

18. The position controller of claim 17 wherein the oscillation command consists of three motion commands, the first motion command indicating the first preselected point, the second motion command indicating the second preselected point, and the third motion command indicating the third preselected point, and each of the motion commands is transmitted from the master computer without terminator characters between the commands.

* * * * *

UNITED STATES PATENT AND TRADEMARK OFFICE
CERTIFICATE OF CORRECTION

PATENT NO. : 4,782,449

DATED : November 1, 1988

INVENTOR(S) : Gary D. Brinker, et al

It is certified that error appears in the above-identified patent and that said Letters Patent is hereby corrected as shown below:

Col. 2, line 34, delete "wherein" and insert --where--.

Col. 4, line 43, "thses" should be --these--.

Col. 13, line 32, "exists" should be --exits--.

Signed and Sealed this

Eighteenth Day of June, 1991

Attest:

HARRY F. MANBECK, JR.

*Attesting Officer*　　　　　*Commissioner of Patents and Trademarks*